US012763381B2

(12) United States Patent
Aikens et al.

(10) Patent No.: US 12,763,381 B2
(45) Date of Patent: Oct. 13, 2026

(54) LI-ION BATTERY HIGH VOLTAGE DISTRIBUTION SYSTEM ARCHITECTURE

(71) Applicant: The Boeing Company, Arlington, VA (US)

(72) Inventors: Sheverria Antony Aikens, Mill Creek, WA (US); Mehdy Barekatein, Kirkland, WA (US); Glen M. Brown, Woodinville, WA (US)

(73) Assignee: The Boeing Company, Arlington, VA (US)

( * ) Notice: Subject to any disclaimer, the term of this patent is extended or adjusted under 35 U.S.C. 154(b) by 807 days.

(21) Appl. No.: 18/182,214

(22) Filed: Mar. 10, 2023

(65) Prior Publication Data

US 2023/0223606 A1 Jul. 13, 2023

Related U.S. Application Data

(63) Continuation of application No. 16/047,931, filed on Jul. 27, 2018, now Pat. No. 11,621,441.

(51) Int. Cl.
*H01M 10/42* (2006.01)
*H01M 10/0525* (2010.01)
(Continued)

(52) U.S. Cl.
CPC ..... *H01M 10/425* (2013.01); *H01M 10/0525* (2013.01); *H01M 10/4207* (2013.01);
(Continued)

(58) Field of Classification Search
CPC ......... H01M 10/0525; H01M 10/4207; H01M 10/425; H01M 10/48; H01M 10/486;
(Continued)

(56) References Cited

U.S. PATENT DOCUMENTS

| | | | |
|---|---|---|---|
| 5,710,504 | A | 1/1998 | Pascual et al. |
| 2012/0319658 | A1 | 12/2012 | White et al. |

(Continued)

FOREIGN PATENT DOCUMENTS

| | | | |
|---|---|---|---|
| CN | 104362688 | A | 2/2015 |
| CN | 106463947 | A | 2/2017 |

(Continued)

OTHER PUBLICATIONS

Baronti et al. ("Design of a Module Switch for Battery Pack Reconfiguration in High-Power Applications" 2012 IEEE International Symposium on Industrial Electronics) (Year: 2012).*

(Continued)

*Primary Examiner* — Brian R Ohara
*Assistant Examiner* — Brent C Thomas
(74) *Attorney, Agent, or Firm* — Alleman Hall LLP

(57) ABSTRACT

Systems and methods for operating a lithium-ion battery high-voltage distribution system architecture are disclosed. A battery pack includes: a plurality of lithium-ion battery cells; a disconnect mechanism operable in an operational position between a battery bus and the plurality of lithium-ion battery cells and a bypass position between the battery bus and a bus-power pass through; and a battery management system. The battery management system is configured to monitor battery pack performance, and responsive to detecting a triggering event in the battery pack performance, cause the disconnect mechanism to be in the bypass position.

20 Claims, 4 Drawing Sheets

(51) Int. Cl.

| | |
|---|---|
| ***H01M 10/48*** | (2006.01) |
| ***H01M 50/204*** | (2021.01) |
| ***H01M 50/249*** | (2021.01) |
| ***H01M 50/581*** | (2021.01) |
| ***H01M 50/583*** | (2021.01) |

(52) U.S. Cl.
CPC ......... *H01M 10/48* (2013.01); *H01M 50/204* (2021.01); *H01M 50/249* (2021.01); *H01M 50/581* (2021.01); *H01M 50/583* (2021.01); *H01M 2010/4271* (2013.01); *H01M 10/486* (2013.01)

(58) Field of Classification Search
CPC ..... H01M 2010/4271; H01M 2200/00; H01M 2200/10
See application file for complete search history.

(56) References Cited

U.S. PATENT DOCUMENTS

| | | | | |
|---|---|---|---|---|
| 2014/0186665 | A1 | 7/2014 | Takeyama | |
| 2014/0242420 | A1* | 8/2014 | Schaffner | H01M 10/48 429/50 |

FOREIGN PATENT DOCUMENTS

| | | | |
|---|---|---|---|
| JP | 2000511398 | A | 8/2000 |
| JP | 2015216814 | A | 12/2015 |
| WO | 9744877 | A | 11/1997 |

OTHER PUBLICATIONS

China National Intellectual Property Administration, Office Action Issued in Application No. 201910496077.5, Dec. 22, 2024, 14 pages.

Japan Patent Office, Office Action Issued in Application No. 2019092127, Jul. 10, 2023, 9 pages.

China National Intellectual Property Administration, Office Action and Search Report Issued in Application No. 201910496077.5, Aug. 17, 2024, 18 pages.

Baronti, F et al., "Design of a Module Switch for Battery Pack Reconfiguration in High-Power Applications," Proceedings of IEEE International Symposium on Industrial Electronics, May 28, 2012, Hangzhou, China, 6 pages.

* cited by examiner

LI-ION BATTERY HIGH VOLTAGE DISTRIBUTION SYSTEM ARCHITECTURE

CROSS REFERENCE TO RELATED APPLICATIONS

This application is a continuation of U.S. patent application Ser. No. 16/047,931, filed Jul. 27, 2018, the entirety of which is hereby incorporated herein by reference for all purposes.

TECHNICAL FIELD

The present disclosure generally relates to operation of lithium-ion (Li-Ion) battery high voltage distribution system architectures. More particularly, the present disclosure relates to systems and methods for implementing management and operational technologies for high-voltage Li-Ion battery systems.

BACKGROUND

Li-Ion batteries are increasingly being utilized as power sources for many types of vehicles, like hybrid or fully-electric automobiles. Different thermal conditions during the charging and discharging of the battery affect the types of chemical reactions inside the Li-Ion battery. With the accumulation of heat, the battery performance may be affected.

SUMMARY OF THE DISCLOSURE

In one aspect of the present disclosure, a battery pack includes a plurality of lithium-ion battery cells, a disconnect mechanism operable in an operational position between a battery bus and the plurality of lithium-ion battery cells and a bypass position between the battery bus and a bus-power pass through. The battery pack further includes a battery management system (BMS) configured to monitor the battery pack performance Responsive to detecting a triggering event in the battery pack performance, the BMS causes the disconnect mechanism to be in the bypass position.

In another aspect of the present disclosure, a battery system includes a plurality of battery packs electrically connected in series. A respective battery pack in the plurality of battery packs includes a plurality of lithium ion cells. A battery bus is configured to connect at least two of the battery packs in the plurality of battery packs in series and at least one disconnect mechanism associated with the respective battery pack in the plurality of battery packs. The at least one disconnect is operable in an operational position between a battery bus and the plurality of lithium-ion battery cells of the respective battery pack and a bypass position between the battery bus and a bus-power pass through. A BMS is associated with the respective battery pack in the plurality of battery packs and monitors the respective battery pack performance. Responsive to detecting a triggering event in the respective battery pack performance, the BMS causes the at least one disconnect mechanism to be in the bypass position.

In one such embodiment, the disconnect mechanism and the bus-power pass through are integral to the battery bus. In another such embodiment, the disconnect mechanism and the bus-power pass through are integral to the battery bus.

Yet another embodiment takes the form of a method of operating a lithium-ion battery pack. The method includes operating a disconnect mechanism in an operational position, the operational position electrically connecting a battery bus to a plurality of battery cells within the lithium-ion battery pack. A current of the lithium-ion battery pack is monitored via a current sensor, and responsive to detecting a short circuit within the lithium-ion battery pack via the current sensor, the disconnect mechanism is caused to be, or operate in, a bypass position. The bypass position electrically connects the battery bus with a bus-power pass-through of the lithium-ion battery pack.

Additional aspects are defined by the claims of this patent.

DETAILED DESCRIPTION

Figure 1:
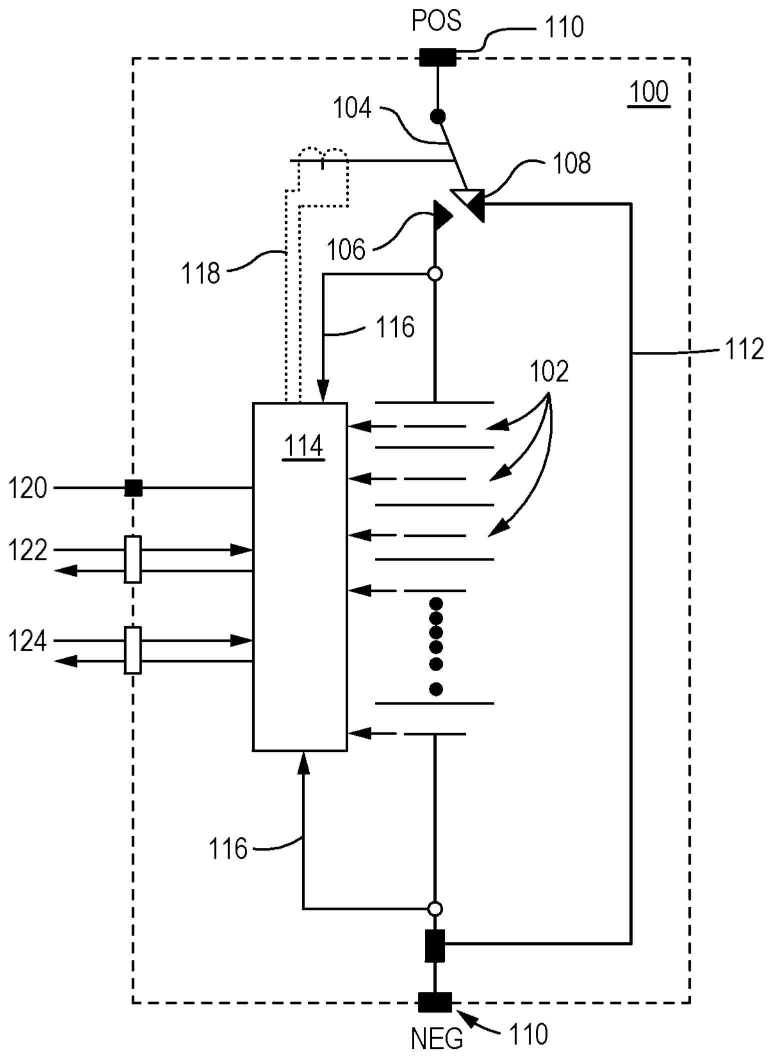
FIG. 1 is a schematic overview of a battery pack, in accordance with an embodiment of the present disclosure.

FIG. 1 is a schematic overview of a battery pack, in accordance with an embodiment of the present disclosure. In particular, FIG. 1 depicts the battery pack 100. The battery pack 100 includes a plurality of lithium-ion battery cells 102 in order to obtain a total voltage of the battery pack 100. The plurality of lithium-ion battery cells 102 include anode and cathode materials separated by a separator. The plurality of lithium-ion battery cells 102 may be configured to interact with a battery management system (BMS) 114 for cell balancing and other similar purposes.

A current sensor 116 detects a current from the plurality of lithium-ion battery cells 102 and provides the detected current to the BMS 114. The current sensor 116 may detect a current at the positive side (e.g., the top as depicted in FIG. 1) of the battery pack 100, the negative side (e.g., the bottom as depicted in FIG. 1) of the battery pack 100, or both the positive and the negative sides of the battery pack 100. One exemplary current sensor is the L37S current sensor manufactured by Tamura Corporation of Tokyo, Japan. However, any appropriately rated current sensor may be used. In some embodiments, a Hall effect current sensor is utilized to detect the battery cell current.

A disconnect mechanism 104 is operable in an operational position 106 that connects a battery bus 110 to the plurality of lithium-ion battery cells 102. In the operational position 106, the plurality of lithium-ion battery cells 102 is electrically connected to the battery bus 110. The disconnect mechanism 104 is also operable in a bypass position 108 that connects the battery bus 110 to a bus-power pass through 112. Throughout the figures disclosed herein, the disconnect mechanisms are depicted in the bypass position 108. According to convention, a disconnect mechanism 104 in the operational position 106 would be depicted with its white triangle contact biased to the left, adjacent to the black triangle associated with the operational position 106. Thus, when in its operational position 106, the disconnect mechanism 104 provides an electrical flow path from a positive end of a battery bus 110, through plurality of lithium-ion battery cells 102, and to the negative end of the battery bus 110.

When in the bypass position 108, the plurality of lithium-ion battery cells 102 is electrically disconnected from the battery bus 110. Thus, when in its bypass position 108, the disconnect mechanism 104 does not provide an electrical flow path through the plurality of lithium-ion battery cells 102. As such, no potential voltage is applied to the battery bus 110 from the plurality of lithium-ion battery cells 102. This permits handling and movement of the battery pack 100 without a potential voltage applied by the plurality of lithium-ion battery cells 102.

In conjunction with FIG. 1 and the battery pack 100, the battery bus 110 may either be connected to a load via a battery bus directly or be connected to a battery pack connection in order to electrically connect numerous other batter packs in series to form a battery system having multiple battery packs.

In some embodiments, the disconnect mechanism 104 is a single-pole double-throw switch or relay. The disconnect mechanism 104 may also be realized by a solid state switch. Example disconnect mechanisms 104 include solid state power controllers capable of operating at 270 VDC, or with any other suitable ratings.

In some embodiments, the transition of the disconnect mechanism 104 from the operational position 106 to the bypass position 108 is an instantaneous, or near-instantaneous, transition. The instantaneous, or near-instantaneous, transition may be realized by a fast acting disconnect mechanism capable of transitioning between an operational position 106 and a bypass position 108 between 5 and 60 milliseconds, although certainly other disconnect mechanisms with faster switching speeds may be used.

The BMS 114 is configured to monitor performance of the battery pack 100 at least in part by monitoring various battery parameters (e.g., current, voltage, temperature, pressure). Responsive to detecting a triggering event in the battery pack 100 performance, the BMS 114 causes the disconnect mechanism 104 to be in the bypass position 108. One example triggering event is the current sensor 116 detecting a short circuit. For example, a rapid spike in the current into or out of the battery pack 100 may indicate a short circuit. Additionally, a voltage measured across the plurality of lithium-ion battery cells 102 may drop to zero, or near zero, as another indication or a short circuit of a battery pack 100.

The triggering event can also be any number of conditions indicative of a pending thermal increase within the battery pack 100. The thermal increase may be detected at least in part by detecting an overvoltage condition, an undervoltage condition, a temperature measured by a temperature probe exceeding a temperature threshold value, a pressure measured by a pressure probe exceeding a pressure threshold value, or the like.

In various embodiments, the detection of the thermal increase condition may be accomplished via the BMS 114 monitoring a single cell within the plurality of lithium-ion battery cells 102. In one example, the voltage of each of the cells within the plurality of lithium-ion battery cells 102 is monitored by the BMS 114. The BMS 114 may determine that a thermal increase condition exists if the voltage of one cell within the plurality of lithium-ion battery cells 102 drops below a threshold voltage value.

Responsive to detecting the triggering event, the BMS 114 is configured to cause the disconnect mechanism 104 to be in the bypass position 108. After detecting a triggering event, the BMS 114 sends a signal, via the disconnect mechanism control 118 to the disconnect mechanism 104 in order to cause the BMS to cause the disconnect mechanism 104 to be in the bypass position 108. The disconnect control 118 may be a relay configured to operate a mechanical switch-type disconnect mechanism, a control voltage to operate a solid state-type disconnect mechanism, or the like.

The disconnect mechanism 104 may be operably connected to and operated by the disconnect mechanism control 118. The disconnect mechanism control 118 may be realized by a relay, that when deenergized, causes the disconnect mechanism 104 to be in bypass position 108. When the disconnect mechanism control 118 is energized, the disconnect mechanism 104 is responsively in the operational position 106.

In one embodiment, the battery pack 100 is not initially installed into a battery system or connected to a load. As such, the disconnect mechanism control 118 is deenergized, which results in the disconnect mechanism 104 being in the bypass position 108. The battery pack 100 is then installed into a battery system in order to apply electrical power to a load. Responsive to receiving an activation signal (e.g., by receiving activation signals via 120-124), the BMS 114 energizes the disconnect mechanism control 118 which causes the disconnect mechanism 104 to transition from the bypass position 108 to the operational position 106. This places the plurality of lithium-ion battery cells 102 in electrical connection with the positive and negative electrodes of the battery pack that interact with the battery bus 110. Then, the battery pack 100, along with any of the other battery packs that are electrically connected to the battery bus 110, are configured to supply electrical power to various electrical loads.

The BMS 114 then continues to monitor the battery parameters. Responsive to detecting a triggering event (e.g., short circuit, thermal increase conditions), the BMS 114 deenergizes the disconnect mechanism control 118 to cause the disconnect mechanism 104 to transition from the operational position 106 to the bypass position 108.

In addition to monitoring the battery pack performance and causing the disconnect mechanism 104 to be in the bypass position 108 responsive to detecting a triggering event, the BMS 114 provides additional services as well. The BMS 114 is also configured to receive external power via 120, communicate analog and digital signals via 122, and provide communications with other services via 124. The BMS 114 may also configured to monitor battery parameters, detect thermal increase conditions (e.g., by monitoring temperature or current measurements), monitor temperature and pressure readings within the battery pack 100, perform battery charging functions, monitor the state of charge and state of health parameters, provide battery-bus power control, and the like.

Figure 2:
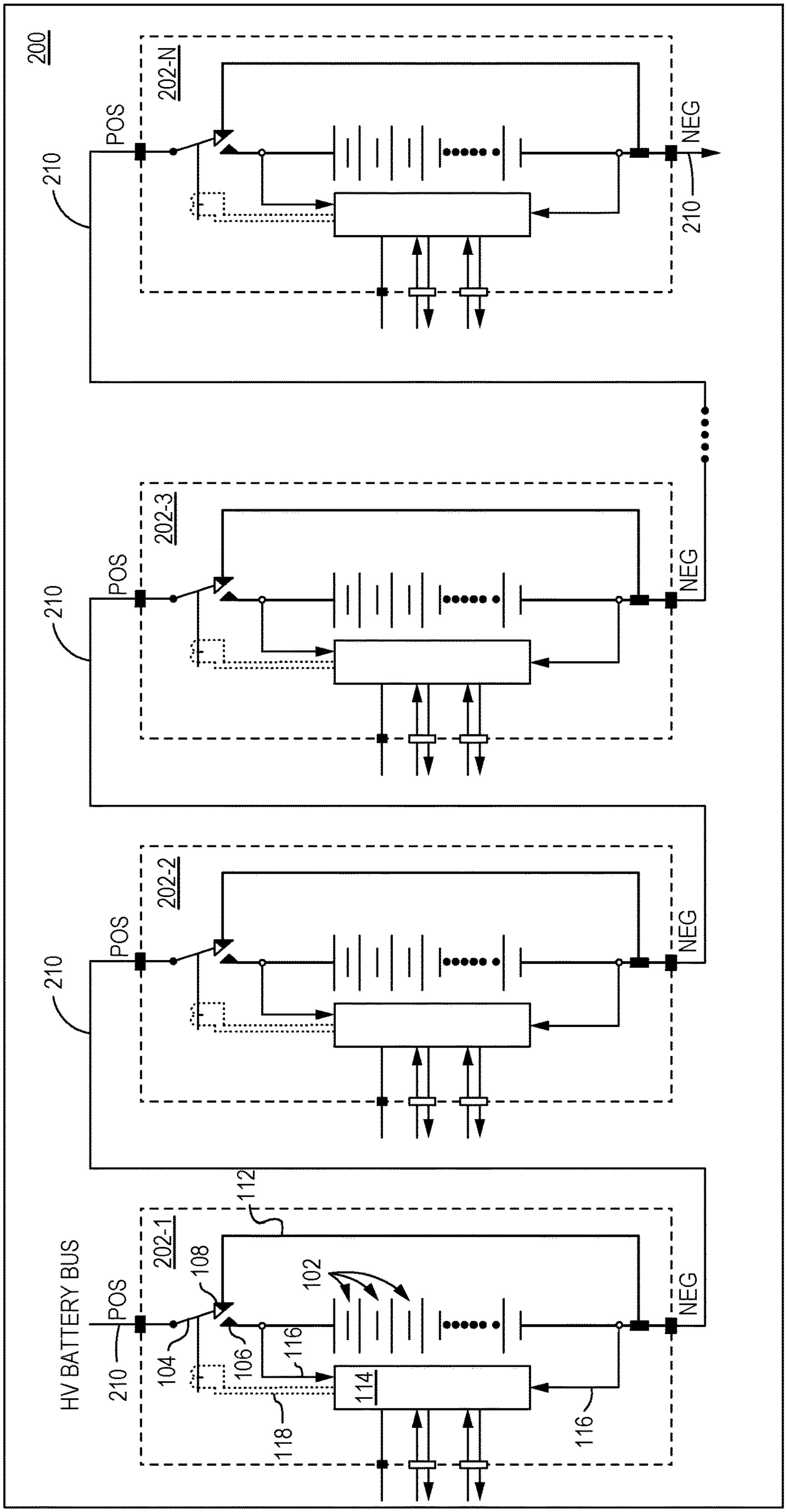
FIG. 2 is a schematic overview of a first battery system, in accordance with an embodiment of the present disclosure.

FIG. 2 is a schematic overview of a first battery system, in accordance with an embodiment of the present disclosure. In particular, FIG. 2 depicts the first battery system 200 that includes a plurality of battery packs 202 connected in series. Here, the battery packs 202 are similar to the battery packs 100 discussed in FIG. 1. Not all of the details of the battery packs 202 are depicted in the battery system 200 for clarity purposes. The battery packs depicted, here the battery packs 202-1, 202-2, 202-3, and 202-N, indicate any number of battery packs may be wired in series. Although at least four battery packs 202 are depicted in the battery system 200, it should be realized that the various embodiments may be practiced with any number of battery packs 202.

In the battery system 200, a negative end of the battery pack 202-1 is connected, via a battery pack connection 210, to the positive end of the battery pack 202-2. The battery pack connection 210 may be realized by an electrical cable, a busbar, or the like. This connection may be repeated for any number of battery packs 202. It is also contemplated that each of the battery packs 202 may have a different voltage across the plurality of lithium-ion battery cells 102 within the respective battery pack 202.

In one embodiment, the voltage potential across the lithium-ion battery cells 102 of the battery pack 202-1 is 50 VDC, 25 VDC across both of the battery packs 202-2 and 202-3, and 15 VDC across the battery pack 202-N. In such an embodiment, a voltage measured across the battery system 200 across all of the battery packs 202-1, 202-2, 202-3, and 202-N, with each having their respective disconnect mechanism 204 in its operational position 106 would be a total of 115 VDC. If in such an embodiment, the disconnect mechanism 104 associated with the battery pack 202-2 were to be in the bypass position 108, the total voltage across the battery system 200 would drop by 25 VDC to 90 VDC in part because the voltage potential provided by the plurality of lithium-ion battery cells 102 associated with the battery pack 202-2 would not be realized as it is removed from the battery system 200 in place of the bus-power pass through 112.

The voltage of the battery system 200 may be increased by the addition of more battery packs 202, an increased voltage of each battery pack 202, or a combination of both. In some embodiments, the battery system 200 is configured to operate above 400 VDC.

As depicted in the battery system 200, the disconnect mechanism 104, the bus power pass through 112, and the current sensors 116 are integral to the battery packs 202. In such a system, the battery pack 202 acts as a stand-alone unit, with these sub-components being internal and integral to the battery pack 202. Thus, troubleshooting and repair of the disconnect mechanism 104, the current sensor 116, or the current sensors 116 may be realized by removing the respective battery pack 202 from the battery system 200, replacing the out-of-specification (e.g. failed or non-functioning) battery pack 202 with a functioning battery pad 202, and troubleshooting and/or repairing the out-of-specification components at a later time and location. Such a battery system would prevent the vehicle the battery system 200 is installed in from being delayed during the troubleshooting and repairs of these out-of-specification components.

Figure 3:
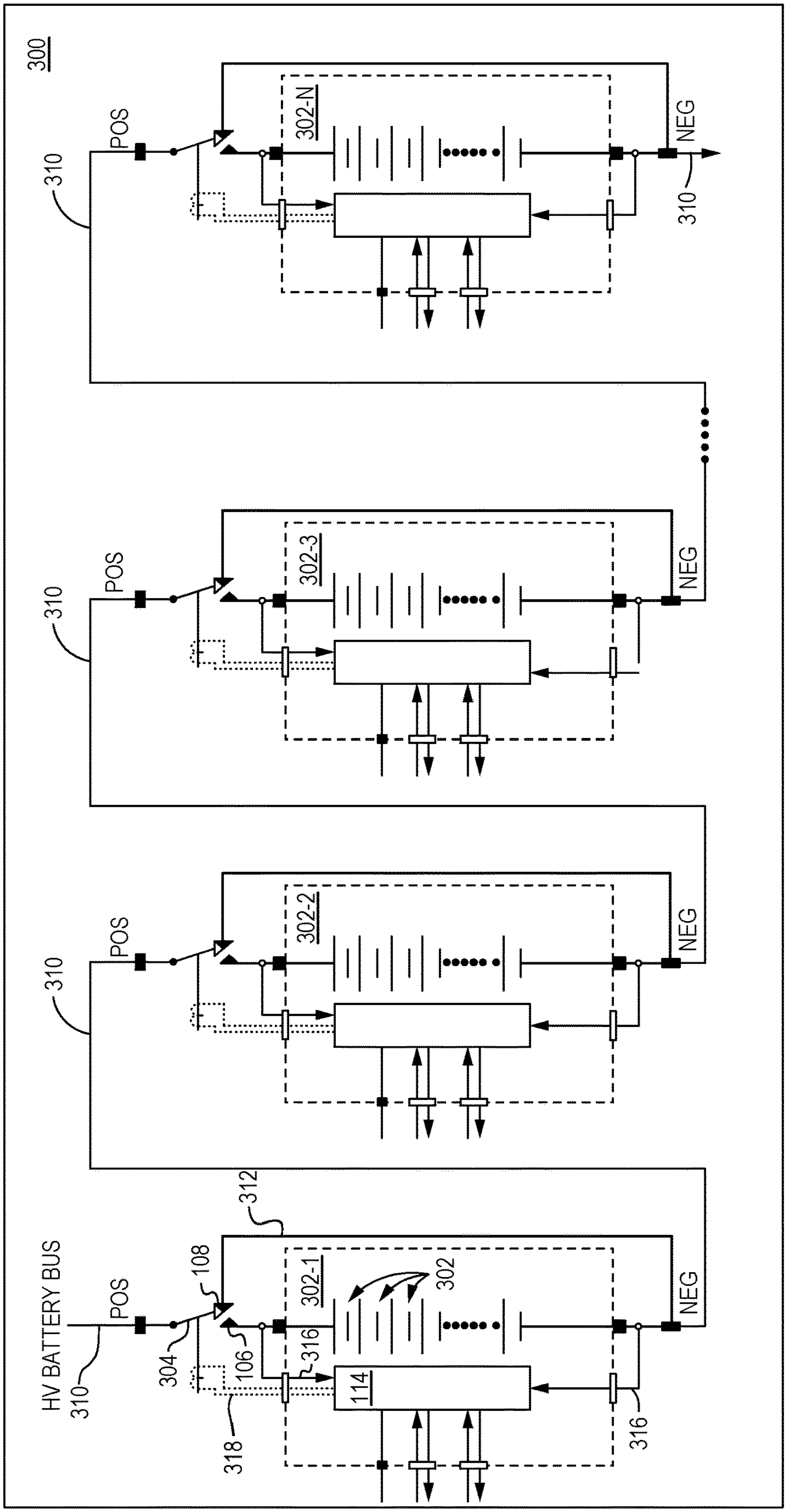
FIG. 3 is a schematic overview of a second battery system, in accordance with an embodiment of the present disclosure.

FIG. 3 is a schematic overview of a second battery system, in accordance with an embodiment of the present disclosure. In particular, FIG. 3 depicts the battery system 300 that is similar to the battery system 200 of FIG. 2. However, as compared to the battery system 200, the battery pack connection 310 includes the disconnect mechanism 304, the bus-power pass through 312, and the current sensors 316 as integral components of the battery pack connection 310 rather than the battery pack 302.

Otherwise, the battery system 300 may operate the same as the battery system 200, with the battery packs 302-1, 302-2, 302-3 to 302-N being wired in series via the battery pack connection 310. As compared to the battery system 200, the battery system 300 includes battery packs 302 that interact with the disconnect mechanism 304, the current sensors 316, and the bus-power pass through 312 outside of the battery pack 302.

In such a system, in response to the BMS 114 detecting a triggering event in the respective battery pack performance, the BMS 114 causes the disconnect mechanism 304 to be in the bypass position 108 between the battery pack connection 310 and the bus-power pass through 312.

As compared to the battery system 200, the battery system 300 allows for a simpler design of the battery packs 302 by allocating some of the components to the battery pack connection 310.

While FIGS. 2 and 3 depict all three of the disconnect mechanism, the current sensor, and the bus-power pass through either being integral to the battery pack or the battery pack connection, it is contemplated that the battery system may include some of these components within the battery pack and the others within the battery pack connection.

Further, to increase redundancy, components may be duplicated. For example, a battery system may include both a disconnect mechanism 104 integral to the battery pack 202 and a disconnect mechanism 304 integral to the battery pack connection 310.

INDUSTRIAL APPLICABILITY

The teachings of the present disclosure have wide uses throughout industry. In one non-limiting example, the battery system 200 is utilized to operate, or power, an aircraft's propulsion system, which is discussed in more detail below in conjunction with FIG. 4.

Figure 4:
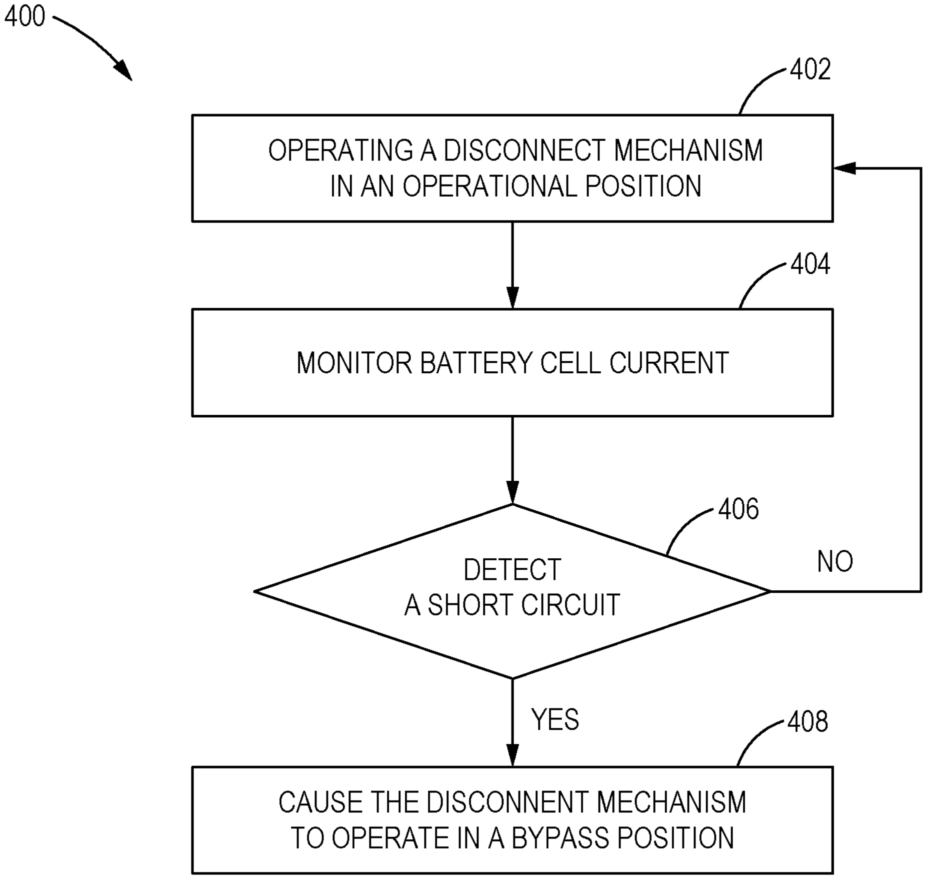
FIG. 4 depicts a method, in accordance with an embodiment of the present disclosure.

FIG. 4 depicts a method, in accordance with an embodiment of the present disclosure. In particular, FIG. 4 depicts the method 400 that includes operating a disconnect in an operational position at block 402, monitoring battery cell current at block 404, detecting a short circuit at block 406, and causing the disconnect to operate in the bypass position at block 408.

The method 400 may be carried out by the battery pack 100, the battery system 200, the battery system 300, or any similar system.

By way of example, the battery system 200 will be used to more fully explain the method 400. In such an example, the battery system 200 includes twelve battery packs 202 wired in series via the battery pack connection 210, with each battery pack 202 having a voltage of 50 VDC across the respective plurality of lithium-ion battery cells 102.

At block 402, each of the twelve battery packs 202 are operating with the disconnect mechanism 104 in the operational position 106. This electrically connects the battery pack connection 210 with the voltage from the respective plurality of lithium-ion battery cells 102 to form the battery bus voltage across the whole battery system 200. Because each battery pack 202 is operating with its disconnect mechanism 104 in the operational position 106, the total voltage across the battery bus is 600 VDC. This total voltage may be applied to an airplane's propulsion system, to other airplane services, or the like, via an electrical distribution system configured to provide the electrical power from the battery system to different electrical loads.

At block 404, the battery current (e.g., the battery cell current) of the lithium-ion battery pack 202 is monitored via the current sensor 116. The BMS 114 receives current information and is configured to detect a short circuit condition. Additionally, or alternatively to monitoring battery cell current as depicted in FIG. 4, the BMS 114 may monitor the battery pack 202 for other indications of a thermal increase condition which may serve as a triggering event. Such indications may include detecting an overvoltage condition, an undervoltage condition, a temperature exceeding a threshold temperature value, a pressure exceeding a threshold pressure value, and the like. Thus, either the detection of a short circuit via the current sensor 116 or the detection of a thermal increase condition may be a triggering event that causes the BMS 114 to cause the disconnect mechanism 104 to operate in the bypass position 108.

At block 406, the BMS 114 determines if a short circuit, or in some embodiments any other triggering event, has occurred. If a short circuit or triggering event has not been detected, the battery system 200 continues to operate per block 402, with the respective disconnect mechanisms 104 being in the operational position 106. At block 408, if a short circuit or triggering event has been detected in a respective battery pack 202, the respective disconnect mechanism 104 is caused to operate in the bypass position 108. This connects the battery pack connection 210 with the respective bus-power pass through 112 for the respective battery pack 202 in which the short circuit or triggering event was detected, effectively bypassing the respective battery pack 202.

In the example utilizing the battery system 200, if a short circuit or triggering event is detected (block 406) in the battery pack 202-2, the BMS 114 in battery pack 202-2 causes, via the disconnect mechanism control 118, the disconnect mechanism 104 in battery pack 202-2 to operate in the bypass position 108 (block 408). The remainder of the battery packs 202 in the battery system 200 continue to operate with their respective disconnect mechanisms 104 in the operational position 106 as a result of the battery pack 202-2 detecting the short circuit or triggering event. Thus, the total voltage across the battery system 200 drops by 50 VDC to a total of 550 VDC because one of the 50 VDC battery packs (i.e.; battery pack 202-2) has its plurality of lithium-ion battery cells 102 removed from providing power to the battery bus 210 because its disconnect mechanism 104 is electrically connected to the bus-power pass through 112.

Because the battery system 200 is now operating with one less battery pack, the power output (and thus its current) provided by each of the other battery packs 202 is expected to increase in order to maintain a constant power output.

The BMS 114 of battery pack 202-2 may be configured to provide communication signals to a central processing unit and/or the other battery packs 202 within the battery system 200 indicating that the battery pack 202-2 is operating with its disconnect mechanism 104 in the bypass position 108, and is thus not providing power to the battery bus.

The central processing unit may be configured to provide an indication to operators of the vehicle (e.g., the pilots of the airplane), transmit a message to a third party separate from the vehicle, or the like, indicating that the battery system 200 has detected a triggering event and at least one of the battery packs 202 is operating with its disconnect mechanism 104 in the bypass position 108. The central processing system may further be configured to automatically reduce power consumption by reducing propulsion power by a set fraction) to compensate for the reduction of available power from the battery system 200.

Further, in response to receiving an indication that another battery pack 202 is operating with its disconnect mechanism 104 in the bypass position 108, the threshold values for detecting a short circuit or thermal increase condition may be altered by the remaining battery packs 202 in the battery system 200. For example, as an immediate response to one battery pack 202 having its disconnect mechanism 104 being transitioned to the bypass position 108, it is expected that the current from the remaining battery packs 202 will increase. During the time period of this transient, as determined by a second battery pack 202 receiving a notification that the first battery pack 202 has detected a triggering event in the first battery pack 202, the threshold limit for detecting a short circuit or a thermal increase condition within the second battery pack 202 may be increased to prevent an inadvertent detection of a triggering event or a short circuit as the current increases to meet the demand from the first battery pack 202 being removed front providing power to the battery system 200.

In various embodiments, the transition of the disconnect mechanism 104 from the operational position 106 to the bypass position 108 is an instantaneous, or a near-instantaneous, transition.

The battery system 200 may be used in another embodiment of the present disclosure. In such an embodiment, the battery system 200 includes thirteen battery packs 202, each having a potential voltage of 50 VDC across the respective plurality of lithium-ion battery cells 102. At least one of the thirteen battery packs 202 is identified as a reserve battery pack. The reserve battery pack initially operates with its battery disconnect mechanism 104 in the bypass position 108. The remainder of the thirteen battery packs are identified as operating battery packs and have their respective battery disconnect mechanisms 104 in the operational position 106. Thus, in an embodiment with one reserve battery pack and twelve operating battery packs, the total voltage across the battery bus 210 is 600 VDC which is generated by the twelve 50 VDC operating battery packs.

During normal operations, each of the operational battery packs may perform the method 400. Responsive to detecting a short circuit (block 406), a respective battery pack may cause its disconnect mechanism to operate in its bypass position (block 408). Additionally, the respective battery pack that detected the short circuit (or other triggering event) provides, or transmits, a communication signal to the remaining battery packs that it has detected a short circuit (e.g., via 120-124). Responsive to receiving the communication that one of the battery packs identified as an operational battery pack is now operating with its disconnect mechanism in the bypass position, the reserve battery pack transitions its disconnect mechanism from the bypass position to the operational position. As a result, when one of the operational battery packs is removed from applying a voltage to the battery bus (e.g., per the method 400), the reserve battery pack becomes an operational battery pack to make up for the energy no longer being supplied to the battery bus.

In another embodiment of a battery system having a reserve battery pack, the reserve battery pack may initially operate with its battery disconnect mechanism in the bypass position. However, under peak-load conditions of the vehicle the battery system is installed, the reserve battery pack may become an operational battery pack with its disconnect mechanism transitioned to the operational position for the duration of the peak load conditions. For example, during take-off of an airplane, the battery system may operate with all battery packs, including any reserve battery packs, having their disconnect mechanism in the operational positions. After the peak load condition has subsided (e.g., the airplane at cruising altitude), the battery system may return to having at least one battery pack operating as a reserve battery pack with its disconnect mechanism in the bypass position.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A method of operating a plurality of lithium-ion battery packs connected in series, wherein at least a first battery pack in the plurality of lithium-ion battery packs is identified as an operational battery pack comprising a battery management system (BMS) and initially having an associated first disconnect mechanism in an operational position, and wherein at least a second battery pack in the plurality of lithium-ion battery packs is identified as a reserve battery pack initially having an associated second disconnect mechanism in a bypass position, the method comprising:

operating the associated first disconnect mechanism of the operational battery pack in the operational position;

monitoring a battery of the operational battery pack via a sensor;

responsive to detecting a short circuit within the operational battery pack via the sensor, causing via the BMS the associated first disconnect mechanism to operate in the bypass position, the bypass position electrically bypassing the operational battery pack;

transmitting, to the reserve battery pack, a communication indicating that the associated first disconnect mechanism of the operational battery pack is in the bypass position, the communication including a notification of the short circuit and that the operational battery pack is operating in the bypass position, and responsive to receiving the communication at the reserve battery pack transitioning the associated second disconnect mechanism of the reserve battery pack to the operational position; and responsive to receiving the communication at the reserve battery pack, increasing a threshold current value for detecting the short circuit.

2. The method of claim 1, wherein a transition between the operational position and the bypass position is an instantaneous transition.

3. The method of claim 1, wherein the disconnect mechanism is one of a single-pole double-throw switch or a solid-state switch.

4. The method of claim 1, further comprising:

using a disconnect mechanism control operably connected to the disconnect mechanism to cause the disconnect mechanism to be in the operational position when energized; and using the disconnect mechanism control to cause the disconnect mechanism to be in the bypass position when deenergized.

5. The method of claim 1, further comprising:

detecting a thermal increase condition; and responsive to detecting the thermal increase condition, switching the disconnect mechanism to the bypass position.

6. The method of claim 5, wherein the thermal increase condition is detected by detecting one or more of an overvoltage condition, an undervoltage condition, or a temperature exceeding a temperature threshold value.

7. The method of claim 1, wherein detecting the short circuit comprises detecting a rapid spike in current sensor signals from a current sensor.

8. The method of claim 1, wherein detecting the short circuit comprises determining that a voltage measured across a plurality of lithium-ion battery cells drops to near zero.

9. The method of claim 1, further comprising:

determining when the lithium-ion battery pack and the plurality of other battery packs are under peak load conditions; and responsive to detecting the peak load conditions, transmitting to other battery packs a communication signal that the BMS has detected the peak load conditions.

10. A method of operating a battery system having a plurality of battery packs connected in series, wherein at least one of the battery packs in the plurality of battery packs is identified as an operational battery pack initially having an associated disconnect mechanism in an operational position, and wherein at least one of the battery packs in the plurality of battery packs is identified as a reserve battery pack initially having an associated disconnect mechanism a bypass position, the method comprising:

monitoring the operational battery pack via a sensor;

detecting a short circuit based at least in part on sensor signals received from the sensor;

responsive to detecting the short circuit, switching the disconnect mechanism associated with the operational battery pack from the operational position to the bypass position; and further responsive to detecting the short circuit, transmitting a communication to the reserve battery pack, the communication including a notification of the short circuit, to thereby cause the disconnect mechanism associated with the reserve battery pack to switch from the bypass position to the operational position and increase a threshold current value for detecting the short circuit.

11. The method of claim 10, wherein each respective battery pack and battery pack connection is integral with its associated disconnect mechanism and bus-power pass through.

12. The method of claim 10, further comprising:

responsive to detecting the short circuit, using at least one disconnect mechanism control operably coupled to at least one disconnect mechanism to cause the at least one disconnect mechanism to be in the operational position when energized; and using the at least one disconnect mechanism control to cause the at least one disconnect mechanism to be in the bypass position when deenergized.

13. The method of claim 10, wherein each disconnect mechanism is one of a single-pole double-throw switch or a solid-state switch.

14. The method of claim 10, further comprising operating the battery system above 400 VDC.

15. The method of claim 10, further comprising using the battery system to operate a propulsion system on an airplane.

16. The method of claim 10, wherein detecting the short circuit comprises detecting a rapid spike in current sensor signals from a current sensor.

17. The method of claim 10, wherein detecting the short circuit comprises determining that a voltage measured across a plurality of lithium-ion battery cells drops to near zero.

18. The method of claim 10, further comprising:

determining when the battery system is under peak load conditions; and responsive to determining that the battery system is under the peak load conditions, transmitting to other battery packs a communication signal that the BMS has detected the peak load conditions.

19. The method of claim 10, further comprising:

detecting a thermal increase condition; and responsive to detecting the thermal increase condition, switching the disconnect mechanism associated with the operational battery pack to the bypass position.

20. A method of operating a battery system having a plurality of battery packs connected in series, wherein at least one of the battery packs in the plurality of battery packs is identified as an operational battery pack initially having an associated disconnect mechanism in an operational position, and wherein at least one of the battery packs in the plurality of battery packs is identified as a reserve battery pack initially having an associated disconnect mechanism a bypass position, the method comprising:

receiving a communication from the operational battery pack, the communication including a notification of a short circuit;

responsive to receiving the communication, switching the disconnect mechanism associated with the reserve battery pack to switch from the bypass position to the operational position; and increasing a threshold current value for detecting the short circuit.

* * * * *